March 6, 1973     E. L. GALLE ET AL     3,719,497

PROCESS FOR PRODUCING A SIMULATED NUTMEAT

Filed June 15, 1970

INVENTORS
EDWARD L. GALLE
MARVIN O. MIKKELSON
BY JOSEPH F. KOLOSKY

ATTORNEY

United States Patent Office 3,719,497
Patented Mar. 6, 1973

3,719,497
PROCESS FOR PRODUCING A SIMULATED NUTMEAT
Edward Louis Galle, St. Paul, and Marvin Olaf Mikkelson and Joseph Francis Kolosky, Minneapolis, Minn., assignors to The Pillsbury Company, Minneapolis, Minn.
Filed June 15, 1970, Ser. No. 46,092
Int. Cl. A23j 3/00; A23l 1/20
U.S. Cl. 99—14                    9 Claims

ABSTRACT OF THE DISCLOSURE

Simulated nutmeat products are prepared by forming a homogeneous dispersion composed of minute droplets of fat or oil suspended in a continuous phase composed of a hydrophilic film-former such as an aqueous protein suspension. The dispersion is atomized and dried to provide particles composed of an oleaginous internal phase encapsulated within the protein film. The particles are placed in a press and subjected to sufficient pressure to cause the particles to become bonded together at their points of contact and to exclude most of the air to form a self-supporting structure having the shape of natural nutmeat preferably. These pieces are then unified by exposure to moisture vapor for a period of time sufficient to increase the moisture level by between about 3 and 30 percent (typically about 10 to 15 percent). The pieces are thereafter dried in air to bring the final moisture content to between 1 and 3.5 percent.

The present invention relates to the production of food products such as simulated nutmeats and more particularly to the production of foods formed by compressing particles which are composed of an internal oleaginous phase and an external phase composed of a hydrophilic film-former.

U.S. Pat. No. 3,431,112 relates to the production of food products to be formed by compressing encapsulated fat droplets for preparing soups, food bars, such as wheat-flakes, cornflakes, rice crispy bars, cornflake bars, hash, potato soup with beef, split pea soup, dried fish bars, peanut bars, dried fruit bars, vanilla-flavored bars, and the like. These products do not, however, have the texture of a nutmeat and are, therefore, unsuitable for this application. In one formulation described in the patent, three parts of water are mixed with 96.75 parts of the spray dry dispersion and .25 part of vanilla extract. This mixture is compressed in molds. This procedure will not, however, produce a sufficiently cohesive product to provide a nut-like consistency. It was also found that when an attempt is made to use higher pressure with a composition of this kind, there was a tendency for the product to delaminate in the molds as well as exuding fat or for capping (sticking of the surfaces to the die face) to occur. When water is mixed with the dispersion prior to molding in a concentration of less than 5 percent, the finished product is powdery in consistency. If more water than 5 percent is added, the fat or oil present will begin to weep from the product or will be expressed during molding. If, on the other hand, less pressure is used, the resulting product will not hold its shape and will not have the chewing characteristics of nutmeats.

In view of these and other defects of the prior art, the present invention has among its objects the provision of an improved food such as simulated nut product and process with the following characteristics and advantages: (a) the ability to consistently produce high quality nutmeats that simulate closely the texture of real nutmeats with a process which can be efficiently and economically carried out on a commercial scale; (b) the provision of a dense nut-like structure without a tendency to express excessive fat or oil during compression molding; (c) the provision of a dense nut-like product which does not delaminate or have poor cohesion when removed from the molds.

These and other more detailed and specific objects of the invention will become apparent in view of the following specification and drawings wherein.

Figure 1:
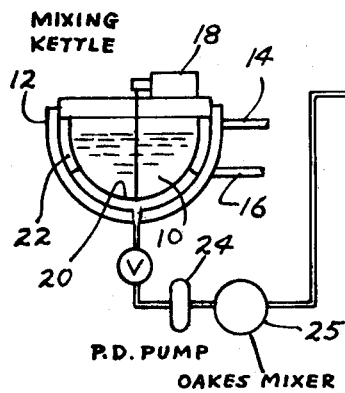
FIG. 1 is a schematic flow diagram showing one preferred method for preparing simulated nuts in accordance with the invention.

Briefly, the present invention provides an improved process for forming simulated nutmeats by providing fat or oil droplets encapsulated within an edible film-forming material to define a substantially continuous, relatively impervious layer over each droplet, then subjecting the encapsulated droplets to pressure sufficient to cause them to become bonded together at their points of contact and to exclude much of the air from between the particles and thereafter unifying the pieces by subjecting them to conditions of humidity sufficient to add at least 3 percent by weight of moisture to the pieces thus molded and for a sufficient period of time to allow the moisture to diffuse through substantially the entire piece and thereafter drying the unified pieces to bring the total moisture content of the finished simulated nutmeats to less than 5 percent and preferably less than 3 percent by weight.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

The present invention provides a compact and highly nutritious simulated nutmeat which can be made from food materials which are inexpensive and readily available. An important feature of the present invention is the provision of processing conditions that will insure the production of a product having a crisp, nut-like character when chewed without subjecting the pieces to such high pressures during manufacture that fat or oil is expressed as a result of the applied pressure.

The starting materials employed in the present invention are preferably formed into a liquid dispersion composed of an edible film-former as a continuous phase which functions as an encapsulating material and a discontinuous phase comprising an edible oleaginous substance such as a fat or oil. Edible food particles such as flour, sugar or starch in powdered form may be dispersed in the oil, distributed between the encapsulated fat droplets or, if desired, suspended in the film-former. In any event, as a first step in forming the composition of the invention, a homogeneous dispersion of an oleaginous substance is dispersed in a continuous phase composed of the encapsulating material; viz., the edible film-former. Water that is present in the continuous phase of the dispersion is removed from the product by drying; e.g., spray drying. Since the moisture is present in the continuous phase, the suspended oil droplets are encapsulated in the solution of hydrophilic film-former. In drying, the oil droplets remain enclosed in the hydrophilic film-former.

The edible oleaginous substance may consist of any type vegetable or animal oil or fat or mixture thereof, including cottonseed oil, corn oil, lard, peanut oil, soy oil, safflower oil, butter, and margarine.

The film-former may consist of any edible substance that will form a film around an edible oil using any known process. Examples are: nonfat milk solids, sodium caseinate, soy protein, egg albumen, egg yolk, wheat germ, gelatin, pea flour, bean flour, corn germ, dried whey, gelatinized starch, fish protein, bran protein, gum arabic, and other hydrophilic colloids, such as carboxy-methyl cellulose.

Minor amounts of modifiers can be added to the film-former if desired. Among such modifiers are salts, polysaccharides, such as sucrose or lactose, polyhydric alcohols, such as glycerin, and other edible food substances, such as starch and the like.

The film can be formed around the edible oil using any known process such as vigorous mixing in an aqueous suspension, coacervation, spray drying, a fat suspension in a film-former and water solution, by coating fat particles that have been chilled to a hard and nontacky condition or by forcing the fat droplets of the particles to fly outwardly through a falling curtain of the film-former. Other methods will be apparent to those skilled in the art.

When spray drying is used to produce the encapsulated oleaginous droplets, water is used to plasticize the film-former. With the film-former in a plastic state, vigorous mixing of the oil and film-former results in the formation of an oil and film-former dispersion. The dispersion consists of fat globules encapsulated in the film-former. The dispersion is then sprayed into heated air.

Figure 4:
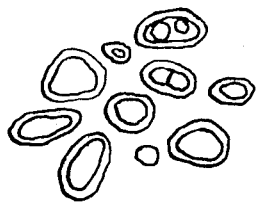
FIG. 4 is a greatly enlarged semidiagrammatic illustration of the particles before being molded.
Figure 5:
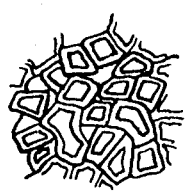
FIG. 5 is a view similar to FIG. 4 after the particles have been molded into pieces.

Referring now to the figures, and particularly FIG. 1, it will be seen that the components of the dispersion 10 are placed within a round-bottom mixing vessel 12 having heating jacket inlet and outlet ducts 14 and 16 and an agitator motor 18 connected through suitable gearing (not shown) to a sweep-arm agitator 20 having blades 22 contacting the external side walls of the mixing vessel 12. The mixing is carried out until a homogeneous dispersion is achieved; about 30 minutes of mixing is usually sufficient. From the mixer 12, the dispersion is transferred by a high-pressure pump 24 to a high shear mixer; e.g., an E. T. Oaks Corporation Mixer 25 (Long Island, N.Y.) to holding tank 27, pump 29, homogenizer 31 and finally to the nozzle 26 of a spray dryer 28 supplied with air forced by blower 30 through heater 32. The material issuing from the nozzle 26 consists of one or more oil droplets surrounded by an envelope of film-former and water. As the water dries, it is removed by evaporation causing the oil to become encapsulated in the film-former. The dried particles are shown highly magnified in FIG. 4.

Figure 2:
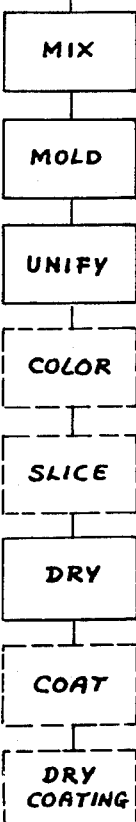
FIG. 2 is a vertical sectional view of the product before being molded.
Figure 2:
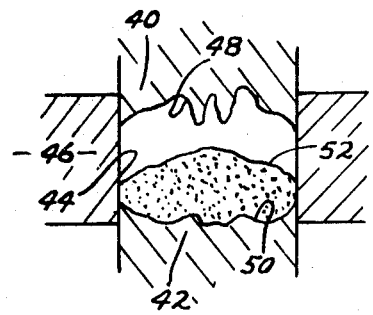
Figure 3:
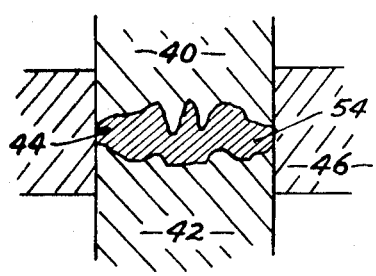
FIG. 3 is a vertical sectional view through the mold after molding has been accomplished.

From the dryer, the particles pass through line 34 to a cyclone collector 36, and are optionally mixed with solid food particles or additives, such as powdered sugar, powdered starch, flavoring materials which may be in either solid or liquid form. The particles are then compresesd within a mold to form pieces as shown in FIGS. 2 and 3. Because the fat is encapsulated, the external film bonds to itself as the particles are subjected to pressure. There is little or no release of fat during the application of pressure. Thus, it is important for the mixture of oil, film-former, and water to be mixed until encapsulation of the oil is complete. A convenient test for determining when the components have been sufficiently mixed is as follows: one drop of the dispersion is placed in a 250 ml. flask of water at 140° F. If fat is released, mixing is not complete and should be continued until the test procedure may be followed without the release of fat. The release of fat in the water system is a visual determination that can be readily made by those skilled in the art.

In making up the dispersion, all of the oil, the protein used as the film-former, carboxy-methyl cellulose, sugar and starch is usually mixed with water in forming the dispersion. If desired, however, a part of the sugar and a part of the starch can be mixed with the spray dried particles after the spray drying has been accomplished. Any suitable known agent for facilitating a flow of the powder during the molding operation can be added to the particles before molding. One suitable flow aid consists of sodium silico aluminate sold under the trade name Zeolex by the J. M. Huber Corporation of Edison, N.J. Nut flavors are normally added to the dry mix which is fed to the molding machine.

The oleaginous fraction of the nut product can be from about 10 to 80 percent by weight of the composition with the remaining fraction comprising the film-former on a dry weight basis exclusive of fillers and extenders. Within this range, the best results have been obtained with about two parts of fat to one part of constituents other than fat on a dry basis. Water should be present in the finished product in the amount of about 10 percent or less and preferably less than 5 percent by weight for adequate preservation.

Refer now to FIGS. 2 and 3 which show a preferred piece-forming operation. As shown in the figures, the press comprises upper and lower punches 40 and 42 respectively which slide through a vertically disposed die opening 44 in die 46. It will be seen that the working surfaces of the dies 48 and 50 respectively are provided with a suitable surface configuration to represent nutmeats. In FIG. 2, it will be seen that the charge of dried encapsulated fat 52 has been placed between the punches. In FIG. 3, the dies have been forced together with a pressure between about 100 and 700 p.s.i. and preferably between about 200 and 300 p.s.i. to form a dense, self-supporting structure 54 having the shape of a nutmeat as seen in cross-section. The punches are then separated and the piece removed. Typical pieces 54 have a density between about .4 and .7 grams per cc. After unification and drying the final piece will usually have a density between about .6 to 1.0 gram per cc. While the surfaces 48 and 50 have been shown as having configuration of a nutmeat, other confiurations can be used; e.g. the punches can, if desired, be composed of parallel ridges and grooves to produce a ribbed pattern on both the upper and lower surfaces of the simulated nutmeat, especially if the nutmeats are to be sliced into smaller pieces. The resulting sliced pieces are almost indistinguishable from real sliced nutmeats.

Next, the pieces 54 are unified by exposure to conditions of humidity sufficient to increase the moisture with about 10 to 15 percent added moisture being preferred. This should be done in no less than about an hour or so to allow the moisture level to become fairly uniform throughout the piece for satisfactory unification. In an atmosphere at 180° F. and 95 percent relative humidity, a hold time of three hours is usually used. The time required for unification, of course, depends upon the original moisture level of each piece and the thickness of the pieces. In any event, at least 3 and preferably at least 10 percent moisture is added to the piece during the unification step. Unification ordinarily takes about two to two and one-half hours and preferably at least three hours. Time as well as the presence of moisture is required for adequate unification.

While the upper limit in the added moisture incorporated into the pieces during unification appears to be 30 percent or more, it is limited primarily by the point at which moisture begins to run off the product. The lower limit is about 3 percent. Generally speaking, the more moisture that is added during the unification step, the greater the internal strength of the finished, dry product. When only 3 percent moisture is added, the finished product may be somewhat weak, although acceptable. With a greater amount of added moisture, greater internal strength is obtained.

Figure 6:
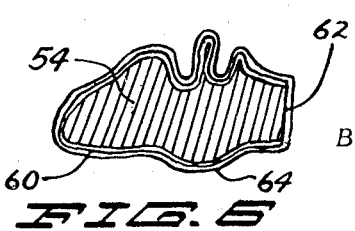
FIG. 6 is a vertical cross-sectional view through a nutmeat product prepared in accordance with the invention.

Following the unification step, an edible coloring material is applied to the surface as shown in FIG. 6 at 60 to simulate the nut skin. The pieces can then be sliced if desired as at 62. Following the application of the colored coating 60, the pieces are dried, preferably in warm air sufficient to bring the moisture content below 10 percent and preferably below about 5 percent.

Drying can be accomplished immediately or if desired the pieces can be allowed to stand for a time before drying is carried out. If elevated temperatures are used for drying, it is preferred to use temperatures between about 100° and 200° F. However, at the higher end of this scale some browning or roasting of the nut may take place which would be undesirable for some applications. Other forms of drying can be used, such as microwave drying. Generally, if the pieces are subjected to conditions of temperature above the boiling point of water, the pieces will puff and, therefore, no longer resemble nutmeats.

It was surprising to find that following the drying of the unified pieces, the otherwise somewhat powdery, weak molded pieces are converted to hard, dry crunchy pieces that simulate almost precisely the texture and chewing characteristics of a real nutmeat.

It was also surprising to find that the particles prepared in accordance with the present invention could be compressed to form pieces of the requisite density to simulate nutmeats without the oil being expelled.

It should, of course, be understood that, in general, at higher temperatures less time is required and at lower temperatures more time is needed to accomplish drying. At least 3 percent more moisture is added during the unification step. When the moisture is subsequently removed during drying, not all of the 3 percent added moisture need be removed. It is only necessary that the final moisture content be less than 3 percent. In practice, however, it is usually desirable to remove most of the added moisture thereby bringing the final moisture content to 1 or 2 percent.

If desired, an edible moisture-resistant coating such as an edible shellac 64 can then be applied to the pieces as seen in FIG. 6. The edible shellac coating or other edible coating 64 will protect the pieces from becoming soggy or soft, especially when the nutmeats are to be used in other food products such as ice cream. The coating 64 is then dried conventionally, if necessary.

Any suitable, commercially available nut flavor can be employed in the required amount to impart the desired flavor and aroma. If desired, flavor can be applied in the coating 64 rather than the nut composition.

Many process variations are possible. By adding at least a part of the sucrose to the dispersion, the product becomes easier to spray dry. Moreover, if a portion of the starch is added to the dispersion, the stability of the dispersion is improved. This assures that the product will be homogeneous when it reaches the spray dryer. Homogenization can also be used for this purpose prior to drying.

The ability of the particles to flow in the mold is a factor which depends upon the particle size, moisture content and the like. We have obtained good results with spray dried products in which most of the particles have a size of about 100 to 600 microns. Generally, the particle size can be reduced as is known by those skilled in the spray drying art by increasing the nozzle pressure or increased by decreasing the pressure.

The original spray dried material will contain from about 0.8 to 5 percent moisture. It is preferred to add little if any moisture to the spray dried product prior to compression in molds since addition of moisture makes the product difficult to feed to the press.

When the finished product is packed for shipment, it is preferred to employ moisture-resistant packaging material such as treated plastic film or a combination of plastic film and aluminum foil. Many moisture-resistant packaging films and materials will be apparent to those skilled in the art. It is also preferred to package the product in dry air; e.g., below 30 percent and preferably below 20 percent relative humidity to insure dryness and crispness in the finished product.

The quantities of ingredients presented herein are expressed on a weight basis.

The invention will be better understood by reference to the following examples.

EXAMPLE I

After melting the shortening if required, the components listed in Table I below are placed in the kettle and thoroughly blended before adding water.

TABLE 1

| | Percent by weight of dry ingredients |
|---|---|
| Hydrogenated vegetable shortening | 61.47 |
| Isolated soy protein; e.g. Promine D by Central Soya, Inc. of Chicago, Ill. | 2.52 |
| Carboxy-methyl cellulose | 0.80 |
| Sucrose | 12.29 |
| Gelatinized tapioca starch | 15.37 |
| Dried egg albumen | 7.55 |
| | 100.00 |

Water (120° F.), 215.

The mixer 12 is then operated for about 15 minutes to obtain a uniform dispersion while being heated to maintain temperature of about 120° F. The mix is then pumped to a spray dryer where the particles are collected with a moisture content of about 0.8 to 1.7 percent moisture. Dry flavor is added and uniformly intermixed with the particles which are then transferred to suitable press such as the Carver Laboratory Press manufactured by Fred S. Carver of New York, N.Y., and tableted at a pressure of about 500 p.s.i. The tablets are then unified at 100° F. dry bulb and essentially 100 percent relative humidity for 2½ hours to obtain a moisture gain of about 4½ percent. They are then dipped in a coloring solution to provide the color layer 62 for 15 to 30 seconds and 80 grams is placed in a Mark V Model Radar Range and exposed to microwave energy for 15 seconds. The pieces are then placed in a drying oven at 192° F. for 5 hours or until the moisture content has been reduced to about 3½ percent. The pieces are then sliced and coated with an edible shellac. The edible shellac coating is then dried.

EXAMPLE II

A simulated nut product is prepared as in Example I except that the following components are used:

TABLE 2

| | Percent by weight of dry ingredients |
|---|---|
| Hydrogenated vegetable oil | 72.0 |
| Isolated soy protein, e.g., Promine D, Central Soya, Inc. of Chicago, Ill. | 2.5 |
| Dried egg albumen | 7.5 |
| Sucrose | 7.0 |
| Gelatinized tapioca starch | 11.0 |
| | 100.0 |

Water, 125.

Dry blend and add water with mixing to form a dispersion as in Example I. From the mixing kettle 12 the mixture is pumped through the homogenizer 31 operating at a pressure differential of 1500 p.s.i. to the spray dryer nozzle which in this instance consists of an S.X. nozzle manufactured by the Sprayings Systems Company of Bellwood, Ill., at a nozzle pressure of 3000 p.s.i. and at a feed rate of about 60 gallons per hour. Product is then spray dried with an air inlet temperature of about 450° F. to obtain a spray dried product having a final moisture content of less than 3 percent. Dry flavor is then added and the powder is transferred to a tableting machine and molded into pieces having the surface configuration of a nutmeat. Finished pieces are then unified at 100° F. dry bulb at 100 percent relative humidity for 5 hours to effect a moisture gain of 14 percent. Pieces are then sprayed with a coloring solution, sliced and dried in an air-drying oven for 16 hours at 140° F. to bring the final moisture content to about 1.5 percent. The pieces are then deep fat fried at 300° F. for 2 minutes. A coating of 5% by weight of calcium stearate is then applied by tumbling in a panner. The product is packaged in a moisture impervious sealed packaging packaging film composed of polyvinylidene chloride laminated to aluminum foil with air at a relative humidity of less than 10 percent.

EXAMPLE III

Dry ingredients listed in Table 3 below are uniformly mixed as described below in a Hobart Mixer to form a homogeneous suspension.

TABLE 3

| | Percent by weight of dry ingredients |
|---|---|
| Vegetable oil (e.g., Durkex 500 oil) | 72 |
| Isolated soy protein | 10 |
| Gelatinized tapioca starch | 11 |
| Sucrose | 7 |
| | 100 |

Water, 200.

Add the desired amount of flavor to a small amount of the oil before placing the oil in the kettle. Blend the ingredients in the mixing bowl thoroughly, attach paddle to the mixer and mix for three minutes on speed 1 to blend the ingredients with the oil. While still mixing on speed 1, add water to dry ingredients in Table 3, and mix at speed 2 for 10 minutes. Turn off mixer and scrape down paddle and bowl. Mix on speed 1 for an additional 10 minutes. Homogenize and pump to spray drier and finish as in Example I.

EXAMPLE IV

Pieces are made as in Example III except that the pieces are sprayed with color immediately after unification and sliced immediately after coloring.

EXAMPLE V

Pieces are prepared as in Example I using the formulation shown in Table 3.

We claim:
1. In a process for preparing a simulated nutmeat comprising, providing a multiplicity of particles of edible oleaginous substance encapsulated by an edible hydrophilic coating material, molding the particles into an aggregate by applying physical pressure thereto of sufficient magnitude to cause the particles to become bonded together at their points of contact and to exclude much of the air from the product whereby the free flowing characteristics of the particles are lost and the particles become bonded together to form edible pieces, the improvement comprising, unifying the pieces thus formed by exposure to moisture for a sufficient period of time to increase the moisture level so that the added moisture comprises at least 3 percent of the total weight of the pieces but less than the point at which moisture begins to run off the product and for a sufficient period of time to allow the moisture content to diffuse through substantially the entire piece whereby the internal strength of the aggregate thus formed is increased and thereafter drying the unified aggregate to form a simulated nutmeat containing less than 10 percent moisture by weight and having the crisp bite and chewing characteristics of nutmeats.

2. In a process for forming product having a crisp texture when chewed like that of a nutmeat comprising forming a dispersion composed of droplets of an edible oleaginous substance dispersed in an aqueous solution of a hydrophilic film-former, drying the dispersion by spraying it into a drying atmosphere, forming the particles into an aggregate by applying physical pressure thereto of sufficient magnitude to cause the particles to become bonded together at their points of contact and to exclude much of the air therefrom whereby the free-flowing characteristics of the particles are lost and the particles become bonded together to form edible pieces the improvement comprising unifying the pieces by subjecting them to moisture for a sufficient period of time to increase the moisture level such that the added moisture comprises at least 3 percent of the total weight of the pieces but less than the point at which moisture begins to run off the product and for a sufficient period of time to allow the moisture content to diffuse through substantially the entire piece to thereby increase the internal strength of the aggregate and thereafter drying the unified aggregate to provide a simulated nutmeat having less than 3 percent moisture by weight to provide the crisp bite and chewing characteristics of nutmeats.

3. The process of claim 2 wherein the particles are formed into pieces by subjecting to a pressure of at least 100 p.s.i. and thereafter unified by exposure to a humid atmosphere for at least one hour.

4. The process of claim 2 wherein dry ingredients are uniformly blended and thereafter water is added to the dry blend with continued mixing for a sufficient period of time to obtain a uniform dispersion of fat droplets in a solution of the hydrophilic film-former as a continuous phase and the product is thereafter dried by spraying the resulting dispersion into a drying atmosphere.

5. The process of claim 4 wherein sugar is mixed with the dispersion to facilitate drying and handling of the dried particles.

6. The process of claim 2 wherein a flow aid is added to the spray dried particles prior to the application of pressure to facilitate molding.

7. The process of claim 2 wherein pieces are unified by adding at least 10 percent by weight of moisture and thereafter dried to bring the total moisture content to less than 3 percent.

8. The process of claim 2 wherein pieces are packaged in a relatively dry atmosphere within a moisture impervious container.

9. The process of claim 2 wherein the dried aggregate is thereafter coated with a coloring material on thesurface thereof, next sliced to define uncolored surfaces and then a moisture impervious edible coating is applied over both said colored and said uncolored surfaces.

References Cited

UNITED STATES PATENTS

| 2,952,544 | 9/1960 | Durst et al. | 99—14 |
| 3,431,112 | 3/1969 | Durst | 99—1 |

RAYMOND N. JONES, Primary Examiner

U.S. Cl. X.R.

99—1, 17, 136